UNITED STATES PATENT OFFICE.

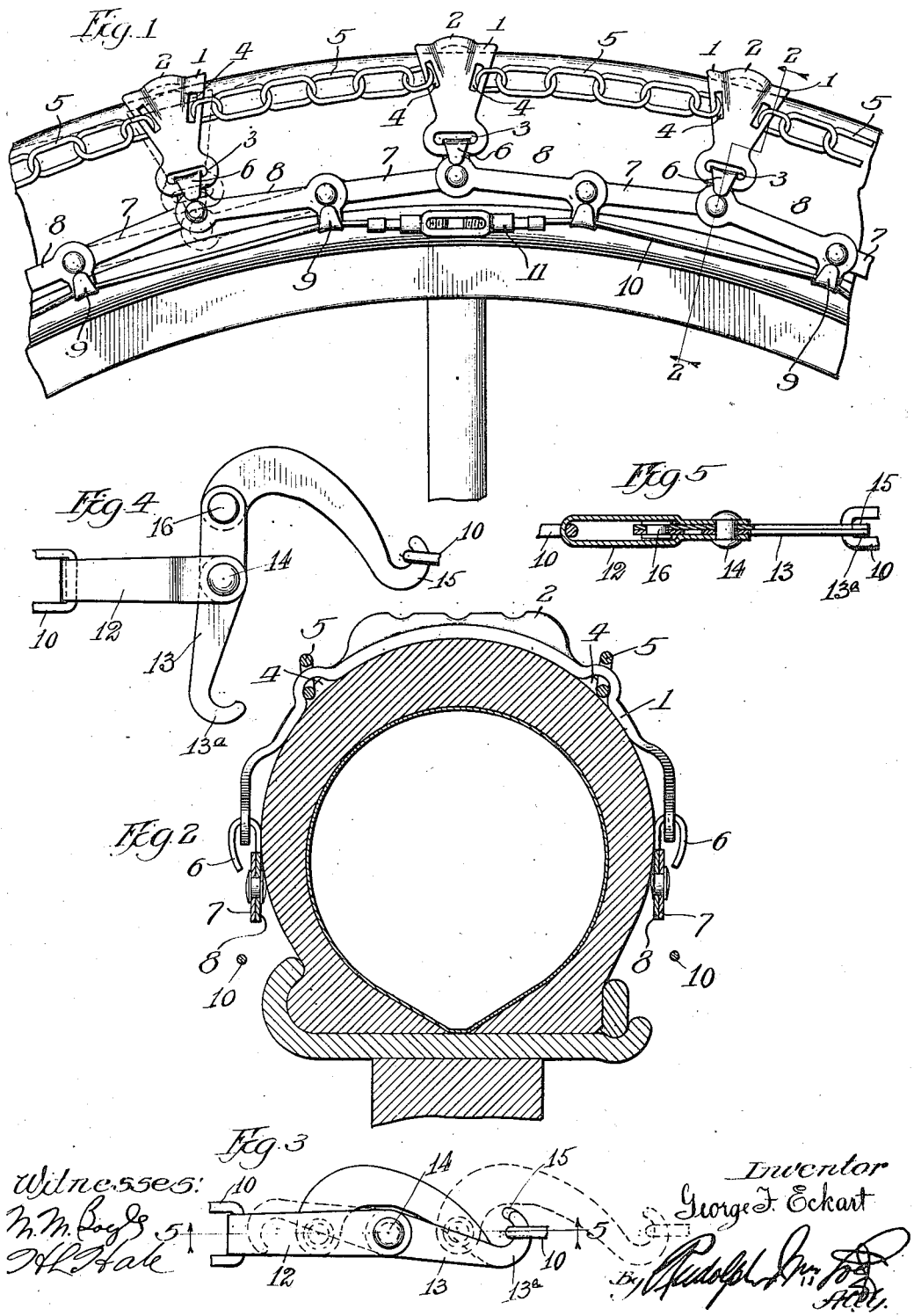

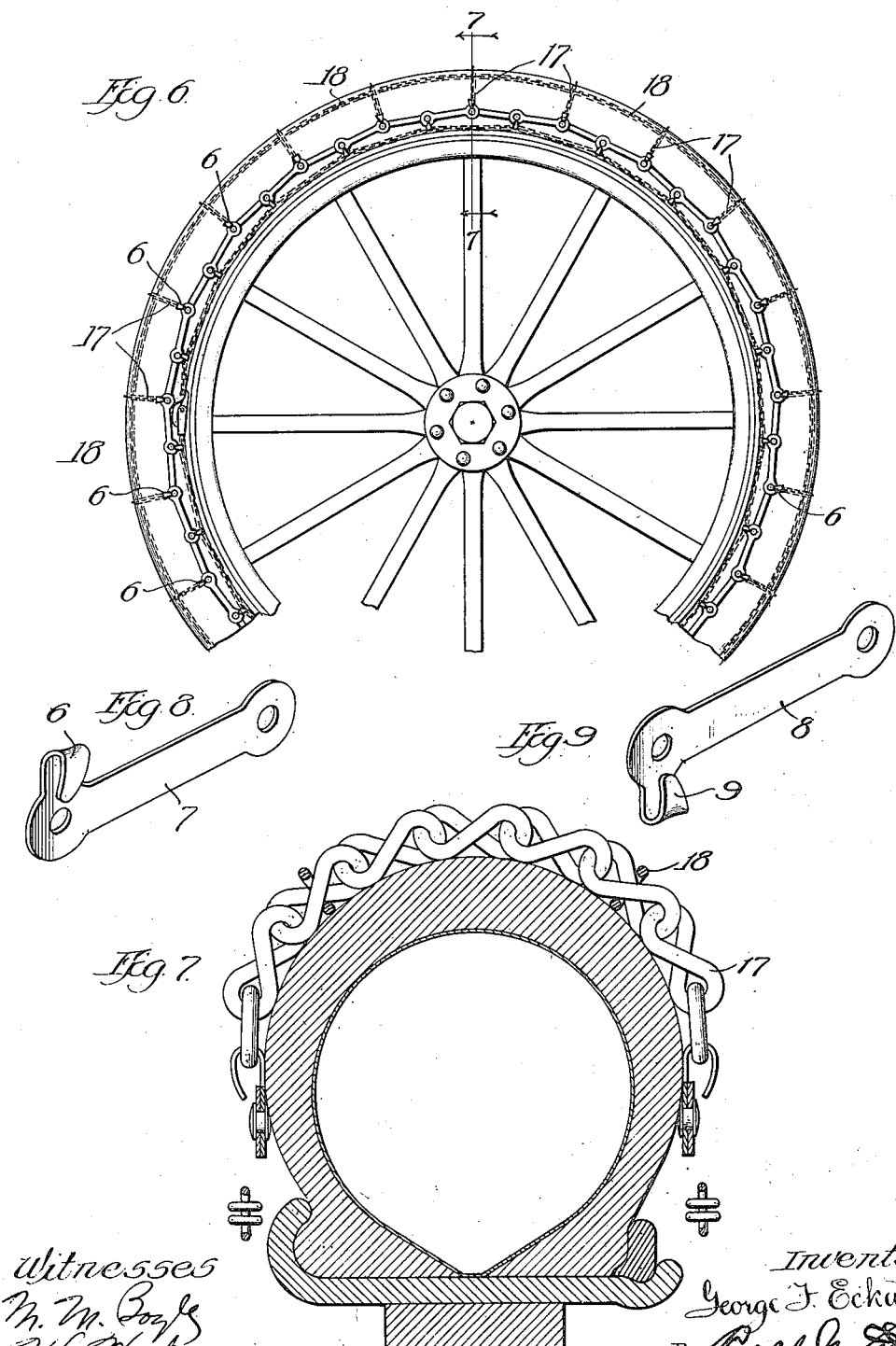

GEORGE F. ECKART, OF CHICAGO, ILLINOIS.

SKID-PREVENTING MEANS FOR VEHICLE-TIRES.

1,045,533. Specification of Letters Patent. Patented Nov. 26, 1912.

Application filed October 23, 1911. Serial No. 656,304.

*To all whom it may concern:*

Be it known that I, GEORGE F. ECKART, a citizen of the United States, residing at Chicago, in the county of Cook and State of Illinois, have invented certain new and useful Improvements in Skid - Preventing Means for Vehicle-Tires; and I do hereby declare the following to be a full, clear, and exact description of the invention, such as will enable others skilled in the art to which it appertains to make and use the same.

This invention has for its object to provide simple and efficient means for preventing skidding of motor propelled vehicles having their wheels equipped with rubber tires, and consists in the features of construction and combinations of parts hereinafter fully described and claimed.

In the accompanying drawings illustrating a suitable embodiment of the invention: Figures —1— is a fragmentary detail side elevation of the rim portion of a vehicle wheel equipped with devices for preventing skidding embodying my invention. Fig. —2— is a detail sectional view of the same on an enlarged scale on the line 2—2 of Fig. —1—. Fig. —3— is a fragmentary detail view in side elevation showing the device for putting certain retaining parts of the apparatus under tension. Fig. —4— is a view in side elevation of the device as shown in Fig. —3—, showing the operative parts of the same in a different position. Fig. —5— is a detail sectional view on the line 5—5 of Fig. —4—. Fig. —6— is a view similar to Fig. —1— on a smaller scale showing a modified form of construction of my non-skidding device. Fig. —7— is a detail transverse section on an enlarged scale on the line 7—7 of Fig. —6—. Figs. —8— and —9— are detail perspective views showing chain links employed in the constructions shown in Figs. —1—, —2—, —6— and —7—.

The particular object of the present invention is to provide a detachable non-skidding attachment for vehicle wheels in which the members for preventing such skidding are maintained at all times in close engagement with the tire tread and the portions of the tire bordering the same.

A further object of the invention is to provide means whereby when the tire is compressed the non-skidding member spanning the same may yield and move with the portion of the tire so compressed without varying the tension maintaining the remainder of said device in close contact with the tire tread and without causing a relative movement of the member so moved relatively to the portion of the tire with which it is in contact.

A still further object of the invention is to provide skid-preventing devices in which no portion of the device passes over or engages the felly or spokes of the wheel.

In the embodiment of the invention shown in the accompanying drawings the members for preventing skidding consist of substantially semi-cylindrical metal members 1 which may be stamped from sheet metal, cast or forged in any suitable manner, each of the same having a tread portion 2 which is relatively flat and may be corrugated or otherwise provided with a rough surface. Each of the said members 1 is provided in the free end portions of its arms with slots 3 and between the ends of said arms with slots or perforations 4. In the latter short sections of chain 5 are adapted to engage, said chain sections being adapted to maintain the members 1 spaced apart the requisite distance around the tire, and being secured at their ends in the said slots or perforations 4 in any suitable or well-known manner. In the said slots 3 the hooks 6 of the chain links 7 are adapted to engage, the said chain consisting of a plurality of links 7 and 8 alternated with each other to form a continuous endless articulate member which is of less circumference than the tread portion of the tire. Each of the links 8 is similarly provided with a hook 9 which extends in the opposite direction from the hooks 6 and in which a wire or cable engages, the ends of the latter being engaged in a turn buckle 11 or other suitable device for taking up slack therein and causing the same to contract the chain consisting of said links 7 and 8 and thereby causing the latter to draw the members 1 radially inwardly and thus maintaining the said members 1 in close contact with the tread portion of the tire. Any suitable device for taking up slack in said wire or cable 10 may be employed, such for example as the device shown in Figs. —3—, —4— and —5—, which consists of a U-shaped member 12 engaged at its middle portion with one end of the wire or cable 10. Between the free end portions of the arms of said member 12 a lever 13 is pivotally secured between its ends by means of the rivet 14 or other suitable device. A hook 15 engaged with the other end of the cord or cable 10 is pivotally secured at the end of its shank with one end of said lever 13 by means of the rivet 16 or other suitable device, the said shank of said hook 15 being curved and the concave portion of which is adapted to receive the pivot member 14 when said lever 13 is thrown over to the position shown in Fig. —5—, and shown in full lines in Fig. —3— so that the axis of said pivot and the axis of the pivot 16 will be thrown out of direct alinement with a straight line drawn between the opposite points of engagement of the wire or cable 10, the axis of the pivot member 16 falling slightly below said line so that the strain imposed upon said hook 15 and said member 12 will tend to throw the axis of the pivot 16 inwardly thus preventing the springing of the said link in a direction to release the tension on the said wire or cable 10 and throwing the pivot member 14 into engagement with the concave portion of the shank of said hook 15. The lever 13 terminates at its other end in a hook 13ª which is adapted to be sprung into engagement with the loop in the wire or cable 10 with which the hook 15 engages thereby decreasing the possibility of accidental turning of said lever 13.

In Figs. —6— and —7— I have shown a modified form of construction of my device in which in place of the sheet metal members 1 short sections 17 of chain are employed which pass laterally over the tread of the tire, the said chains being engaged at their opposite ends by the hooks 6 in substantially the same manner as the members 1 are engaged therewith.

The chains 5 connecting the members 1 with each other or similar chains 18 connecting the contiguous chains 17 with each other in the direction of the circumference of the tire are so disposed as to rest upon the ground when the tread portion of the tire is compressed in traveling over the road and serve to coact with the members 1 or the chains 17 to prevent lateral movement of the vehicle wheels on the road in travel.

It will be noted that by reason of the fact that the hooks 6 are alternated with the hooks 9 that the members 1 or the chains 17 are permitted to move inwardly without materially disturbing the pivots contiguous to the hooks 9 or throwing the said hooks 6 or parts engaged therewith into contact with the cord or cable 10. Thus great freedom of movement of these parts is assured.

The invention is simple and efficient and, by reason of the fact that all parts of the device are engaged only with the tire, scratching or other injury to the felly and spokes of the wheels is obviated. Furthermore, the parts of the device which engage the road are all maintained relatively taut and held against movement relatively to the tire so that throw of the attached parts during rapid rotation of the wheel and consequent digging or other injury to the road will be obviated. By maintaining the shoes or members 1 or their equivalents in contact with the tire tread at all times, a relative movement, creeping or travel of the same around the tire is almost entirely obviated.

I claim as my invention:

The combination with a vehicle tire of two endless articulate members disposed on respectively opposite sides of the tire and of less diameter than the tread portion thereof, each of said members comprising links pivotally connected at their ends and each provided at one end with a hook, said links relatively disposed to bring alternate hooks projecting in respectively opposite directions, members passing laterally over the tire tread secured at their opposite ends to the outwardly projecting hooks of said articulate members, and a tension band for each articulate member engaging in the inwardly projecting hooks thereof.

In testimony whereof I have signed my name in presence of two subscribing witnesses.

GEORGE F. ECKART.

Witnesses:
MAE M. BOYLE,
RUDOLPH WM. LOTZ.